US010920673B2

(12) United States Patent
Widener (10) Patent No.: US 10,920,673 B2
(45) Date of Patent: Feb. 16, 2021

(54) GAS TURBINE WITH EXTRACTION-AIR CONDITIONER

(71) Applicant: General Electric Company, Schenectady, NY (US)

(72) Inventor: Stanley Kevin Widener, Greenville, SC (US)

(73) Assignee: General Electric Company, Schenectady, NY (US)

( * ) Notice: Subject to any disclaimer, the term of this patent is extended or adjusted under 35 U.S.C. 154(b) by 404 days.

(21) Appl. No.: 15/460,301

(22) Filed: Mar. 16, 2017

(65) Prior Publication Data

US 2018/0266330 A1 Sep. 20, 2018

(51) Int. Cl.
| F02C 9/00 | (2006.01) |
| F02C 9/18 | (2006.01) |
| F02C 7/18 | (2006.01) |
| F23R 3/04 | (2006.01) |
| F23R 3/26 | (2006.01) |
| F23R 3/06 | (2006.01) |
| F02C 6/08 | (2006.01) |

(52) U.S. Cl.
CPC ............... *F02C 9/18* (2013.01); *F02C 6/08* (2013.01); *F02C 7/18* (2013.01); *F23R 3/045* (2013.01); *F23R 3/06* (2013.01); *F23R 3/26* (2013.01); *F05D 2260/601* (2013.01)

(58) Field of Classification Search
CPC ...... F02C 9/18; F02C 6/08; F02C 7/18; F02C 7/08; F23R 3/045; F23R 3/06; F23R 3/26; F23R 3/34; F05D 2260/601; F01D 25/12

See application file for complete search history.

(56) References Cited

U.S. PATENT DOCUMENTS

| 6,640,550 | B2* | 11/2003 | Hoffmann | F01K 23/10 60/785 |
| 6,672,069 | B1* | 1/2004 | Stuhlmuller | F02C 3/205 417/173 |
| 9,255,490 | B2 | 2/2016 | Mizukami et al. | |
| 2007/0034171 | A1* | 2/2007 | Griffin | F01K 21/047 122/479.1 |
| 2012/0151930 | A1* | 6/2012 | Patel | F23D 11/383 60/746 |
| 2012/0260667 | A1* | 10/2012 | Chillar | F02C 6/08 60/779 |

(Continued)

FOREIGN PATENT DOCUMENTS

EP 1528238 A2 5/2005

*Primary Examiner* — Todd E Manahan
*Assistant Examiner* — Edwin Kang
(74) *Attorney, Agent, or Firm* — Dority & Manning, P.A.

(57) ABSTRACT

The present disclosure is directed to a gas turbine including a primary compressor, a combustion section disposed downstream from the primary compressor and a turbine disposed downstream from the combustion section. A pipe assembly defines an extraction-air circuit between an extraction port of the primary compressor and an inlet port of the turbine. The gas turbine further includes an extraction-air conditioning system. The extraction-air conditioning system includes a secondary compressor having an inlet and an outlet. Both the inlet and the outlet are fluidly coupled to the extraction-air circuit at respective locations defined along the pipe assembly between the extraction port of the primary compressor and the inlet port of the turbine.

14 Claims, 7 Drawing Sheets

(56) References Cited

U.S. PATENT DOCUMENTS

| | | | | |
|---|---|---|---|---|
| 2013/0269362 A1* | 10/2013 | Wichmann | ............... | F02C 9/16 |
| | | | | 60/773 |
| 2014/0360188 A1* | 12/2014 | Harada | .................. | F02C 7/275 |
| | | | | 60/641.14 |
| 2015/0377056 A1* | 12/2015 | Mizukami | .............. | F01D 21/12 |
| | | | | 60/782 |
| 2016/0033136 A1* | 2/2016 | Kumagai | ............... | F23R 3/283 |
| | | | | 60/737 |
| 2018/0340468 A1* | 11/2018 | Takamura | .............. | F01D 5/087 |

\* cited by examiner

GAS TURBINE WITH EXTRACTION-AIR CONDITIONER

FIELD OF THE TECHNOLOGY

The present invention generally involves a gas turbine. More specifically, the invention relates to a gas turbine having a system for conditioning extraction-air from a compressor of the gas turbine.

BACKGROUND

During operation of a gas turbine engine, pressurized air from a compressor flows into a flow distribution plenum defined within the combustor. The pressurized air flows from the flow distribution plenum into an inlet to a corresponding premix passage of a respective fuel nozzle. Fuel is injected into the flow of pressurized air within the premix passage. The fuel mixes with the pressurized air so as to provide a fuel and air mixture to a combustion zone or chamber defined downstream from the fuel nozzle(s).

Extraction-air may be routed from the compressor for various purposes such as providing cooling air for various components of the turbine. However, extracting the compressed air from the compressor may reduce overall gas turbine performance.

BRIEF DESCRIPTION OF THE TECHNOLOGY

Aspects and advantages are set forth below in the following description, or may be obvious from the description, or may be learned through practice.

One embodiment of the present disclosure is a gas turbine. The gas turbine includes a primary compressor, a combustion section disposed downstream from the primary compressor and a turbine disposed downstream from the combustion section. A pipe assembly defines an extraction-air circuit between an extraction port of the primary compressor and an inlet port of the turbine. The gas turbine further includes an extraction-air conditioning system. The extraction-air conditioning system includes a secondary compressor having an inlet and an outlet. Both the inlet and the outlet are fluidly coupled to the extraction-air circuit at respective locations defined along the pipe assembly between the extraction port of the primary compressor and the inlet port of the turbine.

Another embodiment of the present disclosure is a gas turbine. The gas turbine includes a primary compressor, a combustion section disposed downstream from the primary compressor and a turbine that is disposed downstream from the combustion section. A pipe assembly defines an extraction-air circuit between an extraction port of the primary compressor and an inlet port of the turbine. The gas turbine further includes an extraction-air conditioning system having a combustor module. The combustor module includes an inlet that is fluidly coupled to the extraction-air circuit and an outlet that is fluidly coupled to the inlet port of the turbine.

Another embodiment of the present disclosure is directed to a gas turbine. The gas turbine includes a primary compressor, a combustion section disposed downstream from the primary compressor and a turbine that is disposed downstream from the combustion section. A pipe assembly defines an extraction-air circuit that is in fluid communication with an extraction port of the primary compressor. The gas turbine further includes an extraction-air conditioning system. The extraction-air conditioning system includes a combustor module having a first inlet fluidly coupled to the extraction-air circuit and an outlet fluidly coupled to an inlet bleed heat system disposed upstream from an inlet to the primary compressor.

Those of ordinary skill in the art will better appreciate the features and aspects of such embodiments, and others, upon review of the specification.

BRIEF DESCRIPTION OF THE DRAWINGS

A full and enabling disclosure of various embodiments, including the best mode thereof to one skilled in the art, is set forth more particularly in the remainder of the specification, including reference to the accompanying figures, in which.

DETAILED DESCRIPTION

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, the term "axially" refers to the relative direction that is substantially parallel and/or coaxially aligned to an axial centerline of a particular component, and the term "circumferentially" refers to the relative direction that extends around the axial centerline of a particular component.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Each example is provided by way of explanation, not limitation. In fact, it will be apparent to those skilled in the art that modifications and variations can be made without departing from the scope or spirit thereof. For instance, features illustrated or described as part of one embodiment may be used on another embodiment to yield a still further embodiment. Thus, it is intended that the present disclosure covers such modifications and variations as come within the scope of the appended claims and their equivalents. Although exemplary embodiments of the present disclosure will be described generally in the context of a compressor extraction flow conditioning system for a land based power generating gas turbine for purposes of illustration, one of ordinary skill in the art will readily appreciate that embodiments of the present disclosure may be applied to any style or type of turbomachine and are not limited to land based power generating gas turbines unless specifically recited in the claims.

Figure 1:
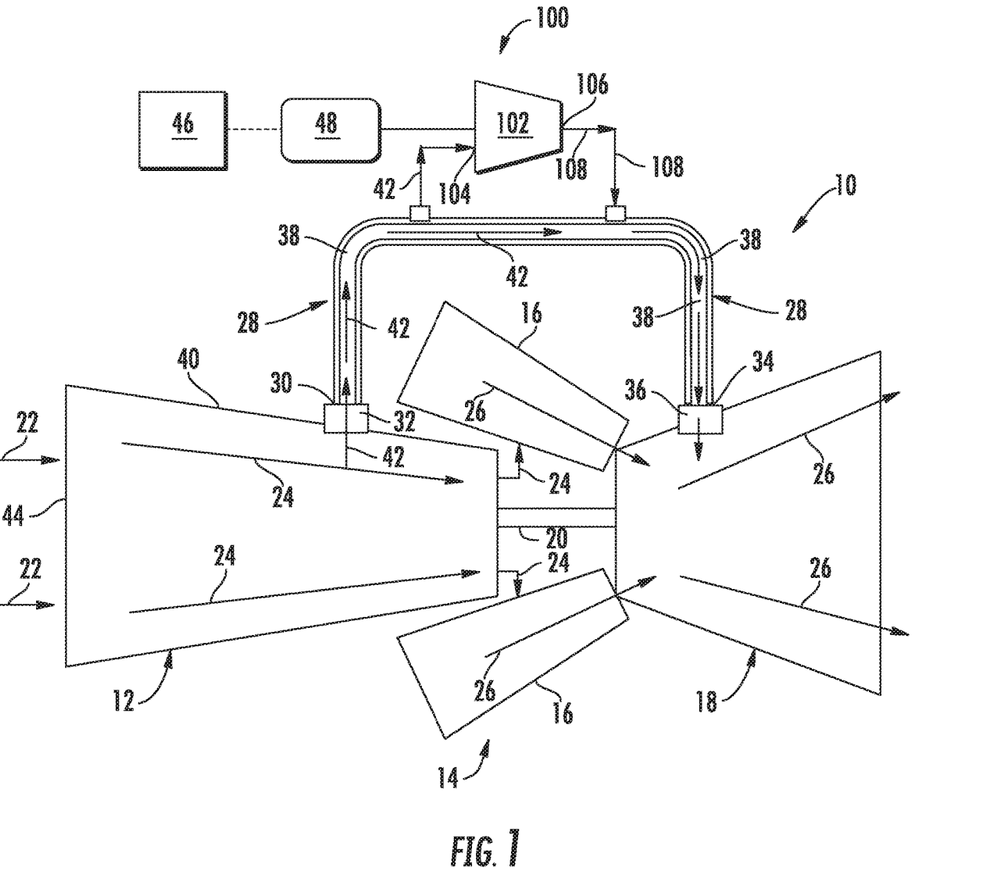
FIG. 1 is a functional block diagram of an exemplary gas turbine that may incorporate various embodiments of the present disclosure.

Referring now to the drawings, FIG. 1 illustrates a schematic diagram of an exemplary gas turbine 10 according to at least one embodiment of the present disclosure. As shown in FIG. 1, the gas turbine 10 generally includes, in serial flow order, a primary or first compressor 12 such as but not limited to an axial compressor, a combustion section 14 including at least one combustor 16 disposed downstream from the compressor 12 and a turbine 18 disposed downstream from the combustion section 14. Additionally, the gas turbine 10 may include one or more rotor shafts 20 that couple the primary compressor 12 to the turbine 18.

During operation, air 22 flows into the primary compressor 12 where the air 22 is progressively compressed, thus providing compressed or pressurized air 24 to the combustor 14. At least a portion of the compressed air 24 is mixed with a fuel within the one or more combustors 16 and burned to produce combustion gases 26. The combustion gases 26 flow from the combustor(s) 16 into the turbine 18, wherein energy (kinetic and/or thermal) is transferred from the combustion gases 26 to rotor blades (not shown), thus causing rotor shaft(s) 20 to rotate. The mechanical rotational energy may then be used for various purposes such as to power the primary compressor 12 and/or to generate electricity. The combustion gases 26 may then be exhausted from the gas turbine 10.

In various embodiments, the gas turbine 10 includes a pipe assembly 28 comprising various pipes, couplings and/or valves. A first or inlet end 30 of the pipe assembly 28 is coupled to an extraction port 32 of the primary compressor 14. A second or outlet end 34 of the pipe assembly 28 is fluidly coupled to an inlet port 36 of the turbine 18. In various embodiments, the pipe assembly 28 defines an extraction-air circuit 38 that extends between the extraction port 32 of the primary compressor 12 and the inlet port 36 of the turbine.

The extraction port 32 may be defined along an outer casing 40 of the primary compressor 12. The extraction port 32 may be in fluid communication with one or more stages (not shown) of the primary compressor 12 depending on a desired pressure and/or temperature of a portion of the compressed air 24, herein referred to as extraction-air 42, that is extracted from the primary compressor 12. For example, the extraction port 32 may be biased or positioned closer to an inlet 44 of the primary compressor 12 to extract a lower pressure and cooler extraction-air 42 or may be biased or positioned closer to the combustion section 14 for extraction-air 42 at a relatively higher pressure and temperature.

In various embodiments, as shown in FIG. 1, the gas turbine 10 includes an extraction-air conditioning system 100. In particular embodiments, the extraction-air conditioning system 100 includes a second or secondary compressor 102 having an inlet 104 and an outlet 106. Both the inlet 104 and the outlet 106 are fluidly coupled to the extraction-air circuit 34 at respective locations defined between the extraction port 32 of the primary compressor 12 and the inlet port 36 of the turbine 18. The inlet 104 of the secondary compressor 102 is fluidly coupled to the extraction-air circuit 38 and/or pipe assembly 28 at a location that is upstream from where the outlet 106 of the secondary compressor 102 is connected to the extraction-air circuit 38.

In operation, only a portion of the extraction-air 42 is routed from the extraction-air circuit 38 into the inlet 104 of the secondary compressor 102. For example, in particular embodiments, less than fifty percent of the total extraction-air 42 entering the extraction-air circuit 38 from the extraction port 32 may flow into the inlet 104 of the secondary compressor 102. In particular embodiments, less than twenty five percent of the total extraction-air 42 entering the extraction-air circuit 38 from the extraction port 32 may flow into the inlet 104 of the secondary compressor 102. In particular embodiments, less than fifteen percent of the total extraction-air 42 entering the extraction-air circuit 38 from the extraction port 32 may flow into the inlet 104 of the secondary compressor 102. In particular embodiments, less than ten percent of the total extraction-air 42 entering the extraction-air circuit 38 from the extraction port 32 may flow into the inlet 104 of the secondary compressor 102. The portion of the extraction-air 42 that flows through the secondary compressor 102 is referred to herein as conditioned extraction-air 108. As used herein, the term conditioned extraction-air 108 refers to the portion of the extraction-air 42 that is at a higher pressure and/or a higher temperature than the extraction-air 42 flowing into the extraction-air circuit 38 from the extraction port 42.

The secondary compressor 102 may be sized depending on a flow rate or the portion of the extraction-air 42 being routed to the secondary compressor 102. The secondary compressor 102 may be used to raise the pressure and temperature of the portion of the extraction-air 42 flowing outside of the extraction-air circuit 38 before it is reintroduced into the pipe assembly 28 and thus back into the extraction-air circuit 42.

The secondary compressor 102 can be an electric motor-driven centrifugal compressor, axial or other type. In various embodiments, the secondary compressor 102 is not dependent on the rotor shaft(s) 20 of the gas turbine 10 for its motive power, and thus can be controlled independently via a controller 46. The controller 46 may be programed to energize a motor 48 to drive the secondary compressor 102 at a minimum level necessary to achieve a particular desired pressure rise and/or temperature rise of the portion of the extraction-air 42 flowing through the extraction-air conditioning system 100.

Figure 2:
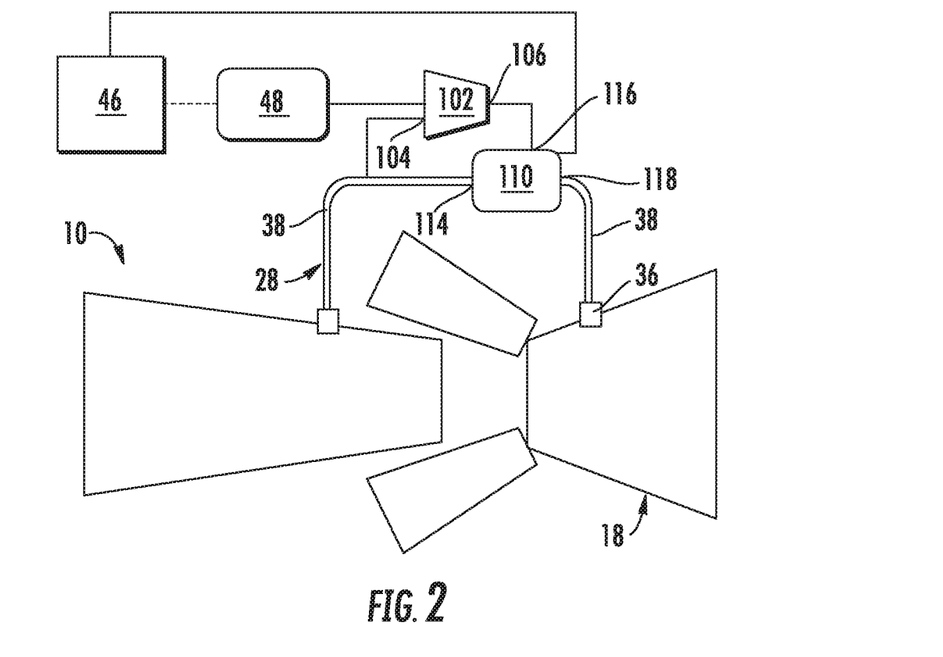
FIG. 2 is a schematic diagram of the exemplary gas turbine as shown in FIG. 1, according to at least one embodiment of the present disclosure.

FIG. 2 illustrates a schematic diagram of the exemplary gas turbine 10 as shown in FIG. 1, according to at least one embodiment of the present disclosure. In particular embodiments, as shown in FIG. 2, the gas turbine 10 and/or the extraction-air conditioning system 100 further comprises a combustor module 110. The combustor module 110 includes a combustor housing 112 having a first inlet 114 that is fluidly coupled to the pipe assembly 28 and in fluid communication with the extraction-air circuit 38, a second inlet 116 that is fluidly coupled to the outlet 106 of the secondary compressor 104 and an outlet 118 that is fluidly coupled to the extraction-air circuit 38 downstream from the first inlet 114 and upstream from the inlet port 36 of the turbine 18. The combustor housing 112 may be at least partially formed by one or more pipes of the pipe assembly 28 and may at least partially define the extraction-air circuit 38.

Figure 3:
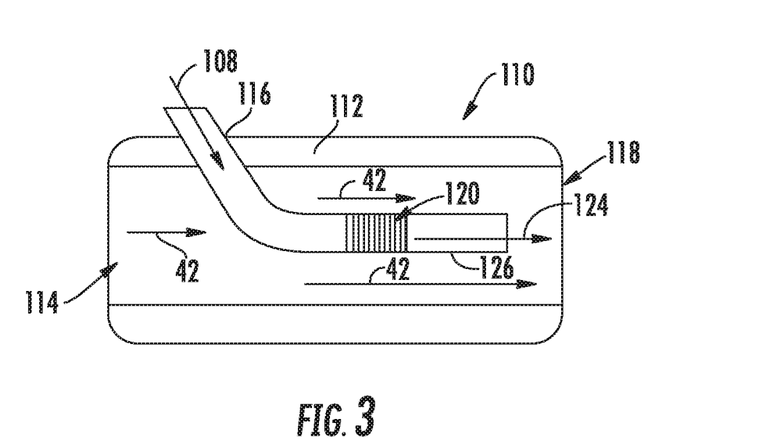
FIG. 3 is an enlarged cross-section side view of an exemplary combustor module according to at least one embodiment of the present disclosure.

FIG. 3 provides an enlarged cross-section side view of the combustor module 110 according to at least one embodiment of the present disclosure. In particular embodiments, as shown in FIG. 3, the combustor module 110 includes a burner or nozzle 120 disposed within the combustor housing 112. The burner 120 is fluidly coupled to the outlet 106 of the secondary compressor 102 via the second inlet 116 of the combustor housing 112 so as to receive the conditioned extraction-air 108. The burner 120 is positioned within the combustor housing 112 downstream from the first inlet 114 and upstream from the outlet 118 of the combustor housing 112.

Figure 4:
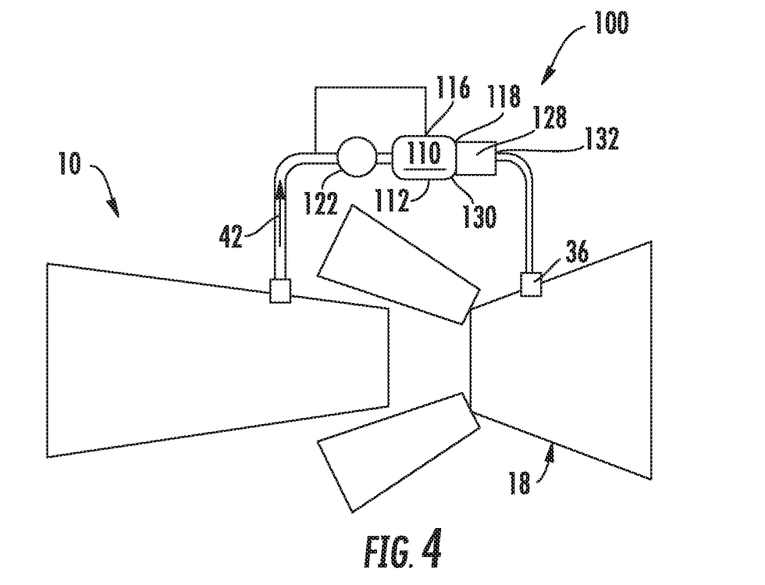
FIG. 4 is a schematic diagram of an exemplary gas turbine according to at least one embodiment of the present disclosure.

FIG. 4 illustrates a schematic diagram of an exemplary gas turbine 10 according to at least one embodiment of the present disclosure. In particular embodiments, as shown in FIG. 4, the extraction-air conditioning system 100 does not include the secondary compressor 102 or in the alternative, the valve 122 diverts a portion of extraction air 42 to the secondary inlet 116 of the combustor 110.

In operation, as shown collectively in FIGS. 2, 3 and 4, fuel may be supplied to the burner or nozzle 120 and then may be mixed with the conditioned extraction-air 108 flowing from the outlet 106 of secondary compressor 102 or for the embodiment shown in FIG. 4, with the extraction air 42 flowing within the pipe assembly 28. This fuel-air mixture 124 may then burn within the combustor housing 112, thereby adding heat and energy to the flow of extraction-air 42 flowing through the pipe assembly 28. In particular embodiments, as shown in FIG. 3, the burner 120 is positioned within the combustor housing 112 such that the extraction-air 42 entering the first inlet 114 fully envelops or fully surrounds the burner 120 as it flows across an outer surface or surface(s) 126 of the burner 120. The relatively cooler extraction-air 42 provides cooling to the burner 120 and/or to the combustor housing 112.

Figure 5:
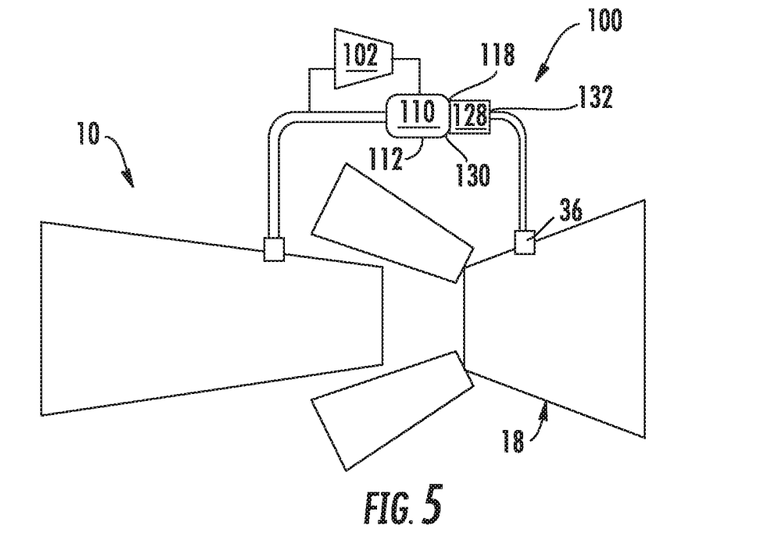
FIG. 5 is a schematic diagram of an exemplary gas turbine according to at least one embodiment of the present disclosure.

FIG. 5 illustrates a schematic diagram of an exemplary gas turbine 10 according to at least one embodiment of the present disclosure. In particular embodiments, as shown in FIGS. 4 and 5 collectively, the gas turbine 10 and/or the extraction-air conditioning system 100 further comprises a mixing chamber 128 disposed downstream from the outlet 118 of the combustor module 110. The mixing chamber 128 includes an inlet 130 that is fluidly coupled to the outlet 118 of the combustor housing 112. In particular embodiments, as shown in FIGS. 4 and 5, an outlet 132 of the mixing chamber 128 is fluidly coupled to the inlet port 36 of the turbine 18.

Figure 6:
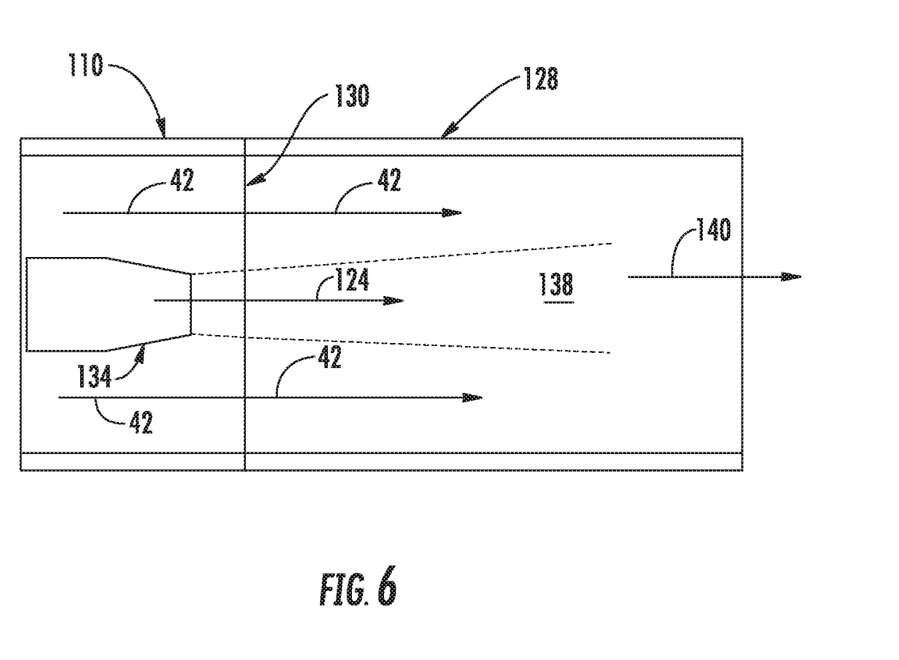
FIG. 6 is an enlarged cross-section side view of an exemplary mixing chamber as shown according to at least one embodiment of the present disclosure.

FIG. 6 provides an enlarged cross-section side view of a portion of the combustor module 110 and at least a portion of the mixing chamber 128 as shown in FIGS. 4 and 5, according to at least one embodiment of the present disclosure. In particular embodiments, as shown in FIG. 6, a discharge tip or end portion 134 of the burner 120 may converge radially inwardly along an axial centerline 136 of the burner 120 proximate to the inlet 130 to the mixing chamber 128 so as to accelerate the flow of the extraction air 42 proximate to the discharge tip 134 portion of the burner 120.

In operation, as illustrated at least partially in FIG. 6, the mixing chamber 128 provides a volume 138 for the burning fuel-air mixture 124 and the extraction-air 42 to more fully mix upstream from the inlet port 36 of the turbine 18, thereby moderating the temperature of a mixture of the extraction-air 42 and the conditioned air 108, indicated by arrow 140 to a level that the pipes of the pipe assembly 28 and various downstream components such as various turbine components can handle. A target temperature would depend on application, and would dictate what fraction of the extraction air 42 is desired to be branched-off from the pipe assembly 28 of the extraction-air circuit 38 to the secondary compressor 102 and/or directly into the combustor module 110. In addition or in the alternative the mixing chamber 128 provides the volume 138 for the conditioned extraction-air 108 and the extraction-air 42 to more fully mix upstream from the inlet port 36 of the turbine 18, thereby exchanging momentum between the high velocity jet of the fuel-air mixture 124 from the discharge tip or end portion 134 and the extraction-air 42 to raise the total pressure of the mixed stream 140 leaving the mixing chamber 128. This additional purpose of the mixing chamber 128 is particularly important to embodiments where there is a secondary compressor 102 and no combustor 110 as shown in FIG. 2.

Figure 7:
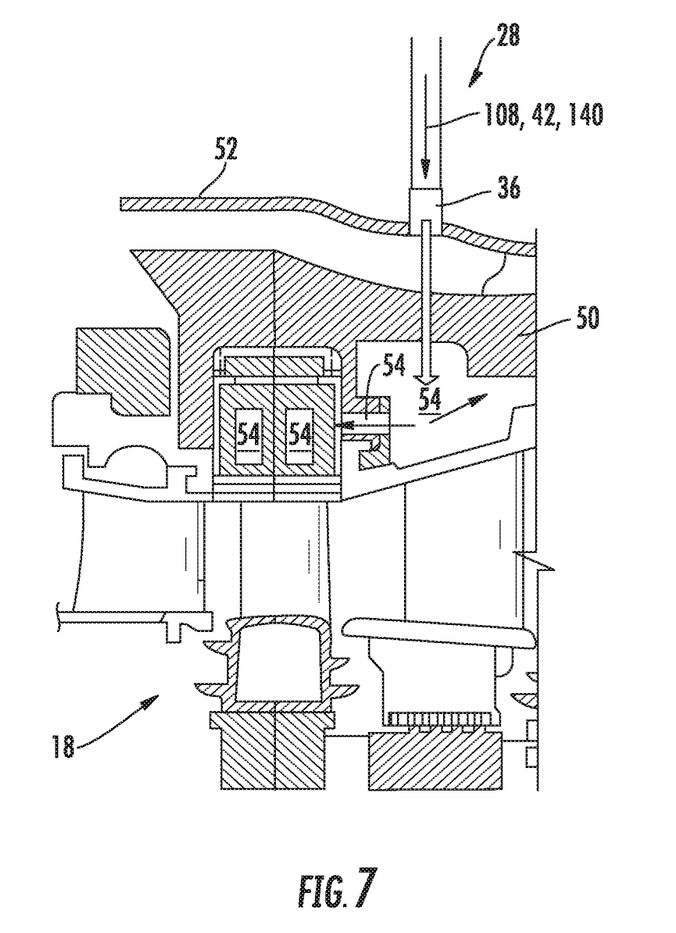
FIG. 7 is a cross-sectioned side view of a portion of an exemplary turbine as may incorporate one or more embodiments of the present disclosure.

FIG. 7 provides a cross-sectioned side view of a portion of an exemplary turbine 18 as may incorporate various embodiments of the present disclosure. In particular embodiments, the turbine 18 includes an inner turbine shell or casing 50 that is enclosed within an outer turbine shell or casing 52. The inner turbine casing 50 includes various coolant passages 54 designed to impart heating or cooling to particular regions of the inner turbine shell 50 and/or various hot gas path components of the turbine 18 by flowing the mixture of extraction-air 42 and conditioned extraction air 108 or the mixed stream 140 through the respective passages 54. By heating and/or raising the pressure of the extraction-air 42 via the extraction-air conditioning system 100 prior to entering the inlet port 36 of the turbine, the rate of heating of the inner turbine shell 50 may be increased, particularly in conditions where rapid transient heat-up is desired.

The extraction-air conditioning system 100 as described in various embodiments herein may also be used to add heat to the extraction-air 42 to reduce the rate of cooling of the inner turbine shell 50 during shutdown, where rapid cooling could close the clearances and result in a rub. This may be especially valuable during a trip scenario where the rotor shaft 20 is decelerating and there is still compressed air flowing through the compressor 12 and the extraction port 32. In the trip scenario, the inner turbine shell 50 and/or the outer turbine shell 52 typically cools more quickly than the rotor 20. Therefore, using the extraction-air conditioning system 100 to slow the cooling rate of the inner turbine shell 50 and/or the outer turbine shell 52 may avoiding a clearance pinch and rub, thereby potentially avoiding gas turbine performance degradation. In addition, it may be valuable to operate the secondary compressor 102 while the gas turbine 10 is offline so as to pre-warm the turbine 18 in anticipation of a cold start.

Figure 8:
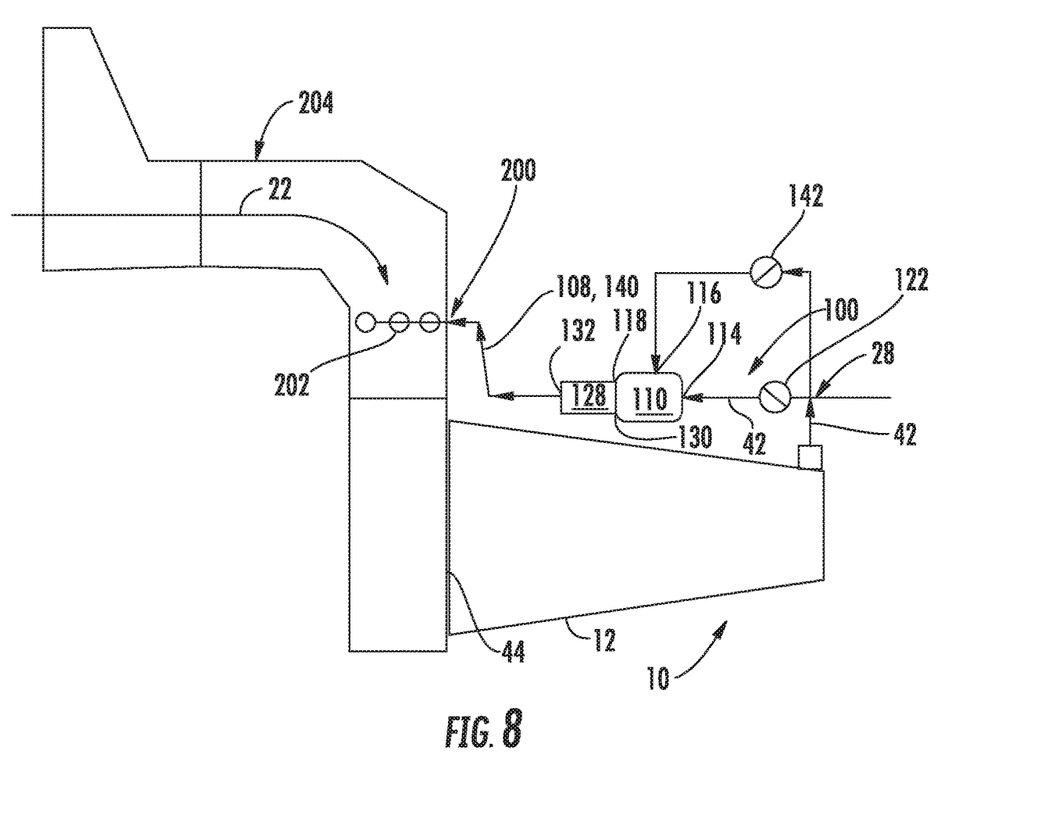
FIG. 8 is a schematic diagram of a portion of an exemplary gas turbine according to at least one embodiment of the present disclosure.

FIG. 8 illustrates a schematic diagram of a portion of an exemplary gas turbine 10 according to at least one embodiment of the present disclosure. In particular embodiments, as shown in FIG. 8, the gas turbine 10 includes an inlet bleed heat system 200 fluidly coupled to the extraction-air conditioning system 100. Known inlet bleed heat systems 200 generally include various pipes or conduits 202 disposed within an inlet duct system 204, particularly within the flow of air 22 upstream from the inlet 44 to the compressor 12. The inlet bleed heat system 200 may serve several purposes. For example, an exemplary inlet bleed heat system 200 may be used to prevent ice formation in forward stages of the compressor during part-load operation, and also to raise the effective compressor inlet temperature at cooler ambient conditions and at part-load as a means of improving backflow margins and combustor emissions.

In one embodiment, as illustrated in FIG. 8, the first inlet 114 of the combustor module 110 is fluidly connected to the pipe assembly 28 and the outlet of the combustor module 118 is fluidly coupled to the various pipes 202 of the inlet bleed heat system 200. In particular embodiments, as shown in FIG. 8, the extraction-air conditioning system 100 further includes mixing chamber 128. The inlet 130 to the mixing chamber 128 is fluidly coupled to the outlet 118 of the combustor module 110 and the outlet 132 of the mixing chamber 128 is fluidly coupled to the various pipes 202 of the inlet bleed heat system 200. The flow of extraction air 42 into first inlet 114 is controlled by valve 120, and the flow of extraction air 42 into the second inlet 116 is controlled by valve 142, with the ratio of flow into first inlet 114 to flow into second inlet 166 controlled to meet a desired temperature of mixed flow at outlet 132.

Figure 9:
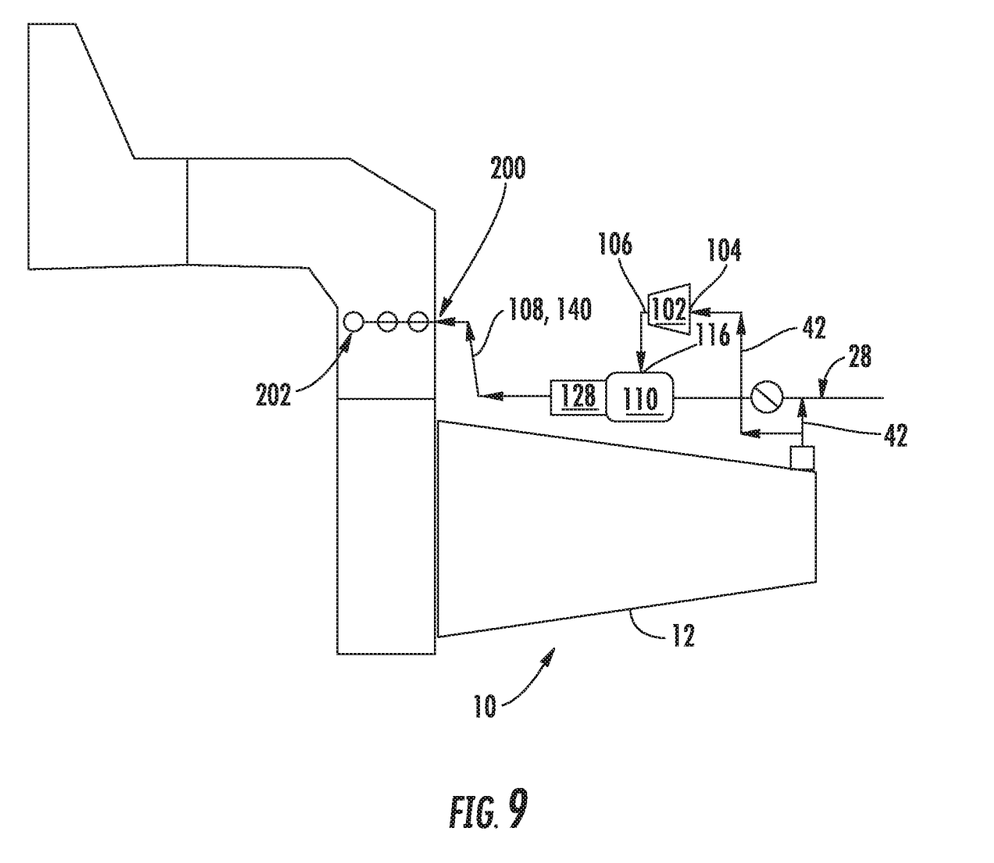
FIG. 9 is a schematic diagram of a portion of an exemplary gas turbine according to at least one embodiment of the present disclosure.

FIG. 9 illustrates a schematic diagram of a portion of an exemplary gas turbine 10 according to at least one embodiment of the present disclosure. In particular embodiments, as shown in FIG. 9, the inlet 104 to the secondary compressor 102 may be fluidly coupled to the extraction-air circuit 38 via pipe assembly 28 and the outlet 106 of the secondary compressor 102 may be connected to the second inlet 116 of the combustor module 110.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A gas turbine, comprising:
a primary compressor, a combustion section disposed downstream from the primary compressor and a turbine disposed downstream from the combustion section, the turbine comprising an inner turbine casing enclosed within an outer turbine shell, wherein the inner turbine casing includes various cooling passages;
a pipe assembly defining an extraction-air circuit between an extraction port of the primary compressor and an inlet port of the turbine disposed on the outer turbine shell, wherein extraction-air flows through the extraction-air circuit from the primary compressor to the inlet port of the turbine and through the various cooling passages of the inner turbine casing;
an extraction-air conditioning system, the extraction-air conditioning system including a secondary compressor having an inlet and an outlet, wherein both the inlet and the outlet are fluidly coupled to the extraction-air circuit at respective locations defined between the extraction port of the primary compressor and the inlet port of the turbine; and,
a combustor module disposed on the extraction air circuit, the combustor module having a first inlet fluidly coupled to the extraction-air circuit, a second inlet immediately downstream the outlet of the secondary compressor and an outlet fluidly coupled to the extraction-air circuit downstream from the first inlet and upstream from the inlet port of the turbine, wherein all the extraction-air exiting the primary compressor flows through the combustor module.

2. The gas turbine as in claim 1, wherein the combustor module includes a burner disposed downstream from the first inlet and the second inlet and upstream from the outlet of the combustor module.

3. The gas turbine as in claim 2, wherein the burner is enveloped within the extraction-air flowing from the extraction port of the primary compressor and through the combustor module, wherein the extraction-air flows around the burner.

4. The gas turbine as in claim 2, wherein a portion of the burner converges radially inwardly along an axial centerline of the burner proximate to an outlet end of the burner.

5. The gas turbine as in claim 1, wherein the extraction-air conditioning system further comprises a mixing chamber disposed downstream from the extraction port of the primary compressor and upstream from the inlet port of the turbine.

6. the gas turbine as in claim 1, wherein a first rotor shaft couples the primary compressor to the turbine.

7. The gas turbine as in claim 6, further comprising a drive motor coupled to a second rotor shaft of the secondary compressor.

8. A gas turbine, comprising:
a primary compressor, a combustion section disposed downstream from the primary compressor and a turbine disposed downstream from the combustion section, the turbine comprising an inner turbine casing enclosed within an outer turbine shell, wherein the inner turbine casing includes various cooling passages;
a pipe assembly defining an extraction-air circuit between an extraction port of the primary compressor and an inlet port of the turbine, wherein the inlet port of the turbine is disposed on the outer turbine shell, and wherein extraction-air flows through the extraction-air circuit from the primary compressor to the inlet port of the turbine and through the various cooling passages of the inner turbine casing;
an extraction-air conditioning system, the extraction-air conditioning system including a combustor module disposed on the extraction-air circuit and having an inlet in direct fluid communication with the extraction port of the primary compressor and an outlet fluidly coupled to the inlet port of the turbine, wherein all the extraction-air exiting the primary compressor flows through the combustor module.

9. The gas turbine as in claim 8, further comprising a mixing chamber disposed downstream from the outlet of the combustion module and upstream from the inlet port of the turbine.

10. The gas turbine as in claim 8, wherein the combustor module includes a burner disposed downstream from the inlet and upstream from the outlet of the combustor module.

11. The gas turbine as in claim 10, wherein the burner is enveloped within the extraction-air flowing from the extraction port of the primary compressor and through the combustor module, wherein the extraction-air flows around and cools the burner.

12. A gas turbine, comprising:
- a primary compressor, a combustion section disposed downstream from the primary compressor and a turbine disposed downstream from the combustion section, the turbine comprising an inner turbine casing enclosed within an outer turbine shell, wherein the inner turbine casing includes various cooling passages;
- a pipe assembly defining an extraction-air circuit between an extraction port of the primary compressor and an inlet port of the turbine, wherein the inlet port of the turbine is disposed on the outer turbine shell, and wherein extraction-air flows through the extraction-air circuit from the primary compressor to the inlet port of the turbine and through the various cooling passages of the inner turbine casing;
- an extraction-air conditioning system, the extraction-air conditioning system including a secondary compressor having an inlet and an outlet, wherein both the inlet and the outlet are fluidly coupled to the extraction-air circuit at respective locations defined between the extraction port of the primary compressor and the inlet port of the turbine; and,
- a combustor module disposed on the extraction-air circuit and having a first inlet fluidly coupled to the extraction-air circuit, a second inlet immediately downstream the outlet of the secondary compressor and an outlet fluidly coupled to the extraction-air circuit downstream from the first inlet and upstream from the inlet port of the turbine, wherein the combustor module includes a burner positioned within a combustor housing, the burner disposed downstream from the first inlet and the second inlet and upstream from the outlet of the combustor module, the combustor housing partially defining the extraction air circuit.

13. The gas turbine as in claim 12, wherein the burner is enveloped within a flow of the extraction-air flowing from the extraction port of the primary compressor and through the combustor housing, wherein the extraction-air flows around the burner.

14. The gas turbine as in claim 13, wherein a portion of the burner converges radially inwardly along an axial centerline of the burner proximate to an outlet end of the burner.

* * * * *